(12) United States Patent
Rinne

(10) Patent No.: US 6,378,695 B1
(45) Date of Patent: Apr. 30, 2002

(54) CONVEYOR APPARATUS WITH ADJUSTABLE GUIDE RAILS

(76) Inventor: Rhett L. Rinne, 3628 Union School Rd., Chester, IL (US) 62233

(*) Notice: Subject to any disclaimer, the term of this patent is extended or adjusted under 35 U.S.C. 154(b) by 0 days.

(21) Appl. No.: 09/663,064

(22) Filed: Sep. 15, 2000

(51) Int. Cl.⁷ .............................................. B65G 21/22
(52) U.S. Cl. .................................................... 198/863.3
(58) Field of Search .......................... 198/836.3, 836.4, 198/345.1

(56) References Cited

U.S. PATENT DOCUMENTS

| | | | |
|---|---|---|---|
| 2,156,020 A | * | 4/1939 | Lathrop .................... 198/836.3 |
| 5,099,979 A | * | 3/1992 | Kehrel ...................... 198/836.3 |
| 5,211,280 A | | 5/1993 | Houde |
| 5,291,988 A | | 3/1994 | Leonard |
| 5,626,221 A | | 5/1997 | Ledingham |
| 5,692,596 A | | 12/1997 | Ledingham |
| 5,701,991 A | | 12/1997 | Helmetsie |
| 5,782,339 A | | 7/1998 | Drewitz |
| 5,896,980 A | | 4/1999 | Butler |
| 5,927,480 A | | 7/1999 | McCaffrey et al. |
| 6,050,396 A | | 4/2000 | Moore |
| 6,053,654 A | | 4/2000 | Ledingham |
| 6,059,096 A | | 5/2000 | Gladieux |
| 6,231,036 B1 | * | 5/2001 | Johnson et al. .......... 198/836.3 |

* cited by examiner

Primary Examiner—Christopher P. Ellis
Assistant Examiner—Mark A. Deuble
(74) Attorney, Agent, or Firm—Ronald E. Smith; Smith & Hopen, P.A.

(57) ABSTRACT

A conveyance system has movable guide rails that can be positioned close to one another when small packages or articles are carried by the system or further apart from one another if the conveyed packages or articles are large. The spacing between the guide rails is controlled by a linkage arrangement that includes a center link mounted for conjoint rotation on a longitudinally disposed drive shaft. Each opposite end of the center link is pivotally attached to an outer link and the outboard end of each outer link is pivotally mounted to a slideably mounted mounting block to which is secured a rail support for holding a guide rail. The drive shaft is rotated manually through a control knob or the rotation is performed by a reversible motor. Alternatively, a bell crank rotates the drive shaft in a first direction to cause convergence of the guide rails and in a second, opposite direction to cause divergence of the guide rails. In a second embodiment, the conveyor system has a curvature formed in it. Curved guide rails have guide rail extensions slideably mounted to them at their opposite ends to enable the guide rails to be effectively lengthened and shortened when the space between them is increased or decreased, respectively.

8 Claims, 10 Drawing Sheets

CONVEYOR APPARATUS WITH ADJUSTABLE GUIDE RAILS

BACKGROUND OF THE INVENTION

1. Field of the Invention

This invention relates, generally, to conveyance systems. More particularly, it relates to a versatile conveyance system that can accommodate packages of varying widths.

2. Description of the Prior Art

In conventional conveyor belt systems, a pair of fixed position guide rails flank the conveyor belt. These systems work well in those applications where the breadth of the packages, containers, or other objects being conveyed from one point to another are of a common breadth. However, they cannot be used in a conveyor system that handles objects of varying widths.

Where objects of varying widths are to be conveyed, the transverse or lateral spacing of the guide rails must be adjustable. Inventors have developed several conveyor systems having adjustable guide rails. For example, U.S. Pat. No. 5,211,280 to Houde discloses an assembly where the position of one of the guide rails may be adjusted by a rack and pinion assembly. The position of the other guide rail, however, cannot be changed by said rack and pinion assembly. An internal cam mechanism is employed to adjust the lateral spacing between guide rails in the structure disclosed in U.S. Pat. No. 5,291,988 to Leonard. A tapered clamp performs that function in the assembly disclosed in U.S. Pat. No. 5,626,221 to Ledingham. U.S. Pat. No. 5,692,596, also to Ledingham, discloses a split support rod held by a clamp. Another clamp assembly is disclosed in U.S. Pat. No. 5,701,991 to Helmetsie. U.S. Pat. 6,050,396 to Moore discloses a rack and pinion assembly that interconnects both guide rails to a single pinion. There are at least another half dozen patents disclosing other mechanisms for varying the transverse or lateral spacing between longitudinally extending guide rails.

All of the earlier assemblies perform their respective intended functions. However, they are mechanically complex and as a result they require frequent maintenance and adjustment. Such work sometimes requires that the conveyor line be shut down at great expense. What is needed, then, is a much simpler assembly that requires minimal maintenance and adjustment.

Some of the earlier assemblies also have width-adjustment means the operation of which is time-consuming. For example, one embodiment of the '396 patent to Moore requires an operator to manually turn a knob to effect rotation of a drive shaft that carries a pinion gear that is meshingly engaged to rack gears upon which are mounted rail supports that carry the guide rails of the system. It is a time-consuming job to rotate the knob until the desired spacing between guide rails has been achieved. Moreover, rack and pinion gears are not easy to fabricate and they may disengage from one another. In another embodiment of the Moore assembly, a reversible motor performs the shaft rotation function. However, such motors are not inexpensive. In both the rack and pinion embodiment and the reversible motor embodiment, there is no easy way to lock the guide rails into position once the desired spacing has been achieved.

What is needed, then, is a better means for adjusting the spacing between conveyor system guide rails. The improved means should neither require nor exclude use of a motor. However, it should enable a machine operator to manually perform the width adjustment in a very precise, fast and easy way. Moreover, a self-locking means is needed as well.

However, in view of the prior art in at the time the present invention was made, it was not obvious to those of ordinary skill in the pertinent art how the identified needs could be fulfilled.

SUMMARY OF THE INVENTION

The longstanding but heretofore unfulfilled need for a conveyor apparatus of elegant yet effective design is now met by a new, useful, and nonobvious invention that has utility in conveyor and conveyance systems.

The novel apparatus for varying the lateral spacing between guide rails in a conveyor assembly or conveyance system includes a straight drive shaft of elongate construction that is mounted for rotation about a longitudinal axis of rotation. A rotation means is provided for selectively rotating the drive shaft in a first direction about its axis of rotation and in a second direction about said axis, the second direction being opposite to the first direction. The rotation means includes a linkage means formed by a rigid center link and two rigid outboard links. All of the links are of flat, straight configuration. The center link is centrally apertured to accommodate the drive shaft. Moreover, the center link is mounted for conjoint rotation with the drive shaft so that rotation of the drive shaft effects simultaneous and corresponding rotation of the center link. In a preferred embodiment, the drive shaft is noncircular in transverse section and the central aperture formed in the center link is complementally formed therewith. The center link is pivotally connected at its opposite, outboard ends to inboard ends of the respective outboard links. Each outboard link has an outermost free end and a slideably mounted mounting block is pivotally connected to the respective outermost free ends of the outboard links. An upstanding rail support member is mounted to each of the slideably mounted mounting blocks. A first guide rail is mounted to a first rail support member and a second guide rail mounted to a second rail support member.

Accordingly, rotation of the drive shaft in a first direction effects convergence of the first and second guide rails and rotation of the drive shaft in a second direction opposite to said first direction effects divergence of the first and second guide rails.

Several means are disclosed for enabling rotation of the drive shaft. In one embodiment, a control gear is mounted on the drive shaft for conjoint rotation therewith in longitudinally spaced apart relation to the center link so as not to interfere therewith and a pinion gear is disposed in meshing engagement with the control gear. The pinion gear is mounted for conjoint rotation at the distal end of an elongate control shaft having a control knob mounted on a proximal end thereof for conjoint rotation therewith. In this way, manual rotation of the control knob in a first direction effects rotation of the control gear and hence said drive shaft in said first direction. Manual rotation of the control knob in a second direction opposite to the first direction effects rotation of the control gear and hence the drive shaft in a second direction.

A second means for enabling rotation of the drive shaft includes a reversible motor means having an output shaft secured to the drive shaft for conjoint rotation therewith.

A third means for enabling rotation of the drive shaft includes a bell crank means having a first end mounted to the drive shaft for conjoint rotation therewith and a second end, disposed at a fixed angle to the first end, to which is pivotally secured an elongate control arm.

There are three illustrative means for effecting rotation of the bell crank, although equivalent means are within the scope of this invention.

A first means is manual, i.e., a second or free end of the elongate control arm is adapted for manual engagement so that manual displacement of the elongate control arm in a first direction effects rotation of the drive shaft in a first direction and manual displacement of the elongate control arm in a second direction effects rotation of the drive shaft in the second direction.

In a second means, an elongate screw actuator pivotally engages and displaces the free end of the control arm.

A third means includes a pneumatic cylinder that pivotally engages the second end of the control arm. Both the screw actuator and the pneumatic cylinder provide enhanced utility because such mechanisms enable locking of the guide rails into a preselected position when the desired spacing has been set.

Guide rail sections having a bend or curvature formed therein may also be employed to enable the conveyor or conveyance assembly to follow a curved path of travel. Extension guide rails of straight configuration are slideably mounted to the curved guide rail sections and are connected thereto by a stop block and rod assembly. The opposite ends of each curved guide rail section are axially bored to slideably receive an associated rod and the free end of each rod is secured to a stop block that surmounts the extension guide rails.

Thus it is understood that the primary object of the invention is to provide a novel conveyance apparatus that provides adjustable width guide rails but which has a small number of moving parts and which is free of gear arrangements.

A closely related object is to provide such a reliable and durable apparatus that minimizes maintenance problems and thus conveyor belt downtime.

Still another important object is to provide a control means that enables a machine operator to vary the lateral spacing between guide rails in a fast, precise, and easy way, free of control knobs and motors.

Yet another important object is to provide a mechanism that is self-locking so that the spacing between guard rails remains the same during operation of the apparatus.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
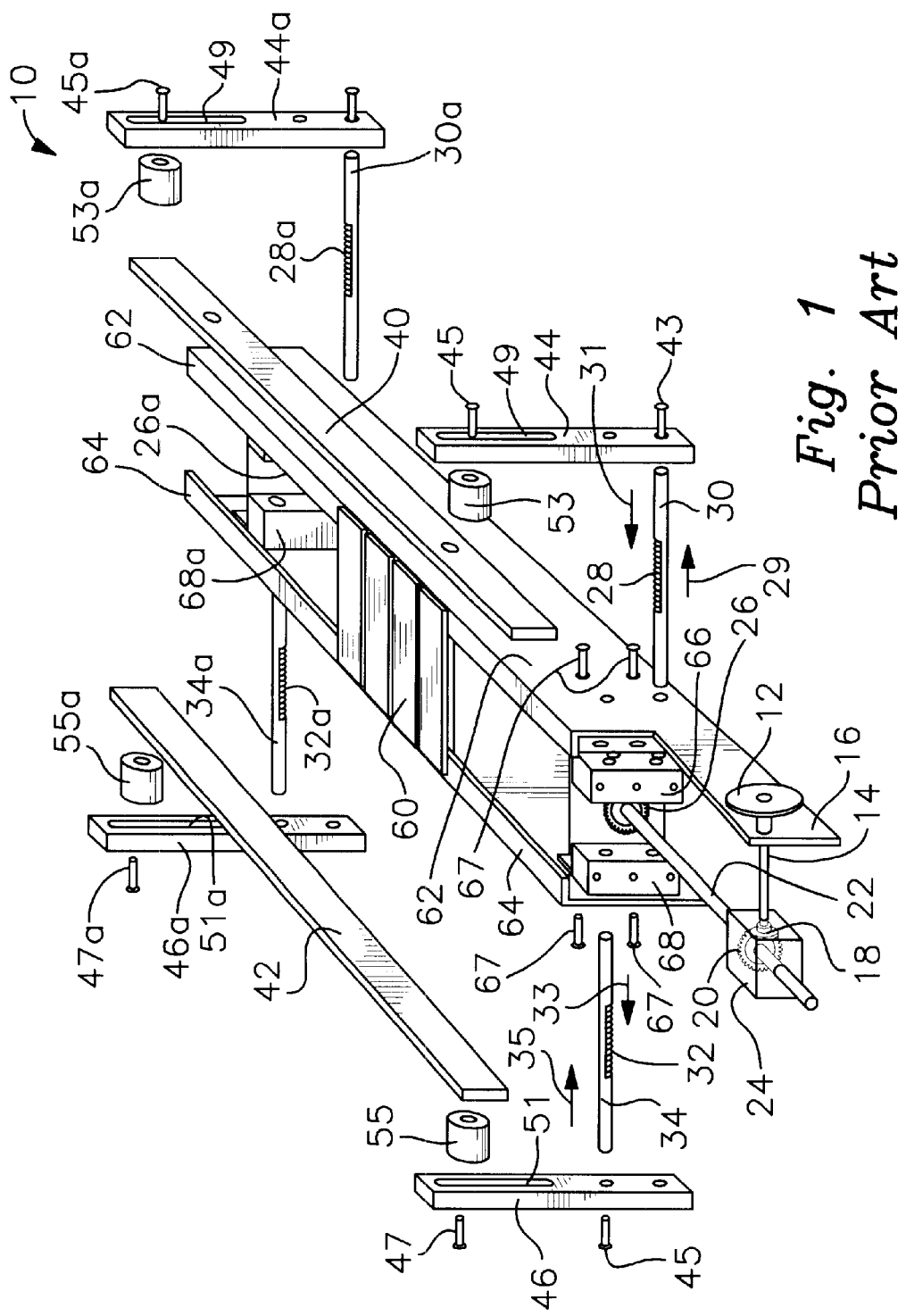
FIG. 1 is an exploded perspective view of a prior art assembly.

Referring initially to FIG. 1, it will there be seen that the reference number 10 denotes a prior art embodiment that will be described to better illustrate the need for an improvement in the means for changing the lateral spacing between guide rails.

The prior art conveyor,apparatus having adjustable guide rails includes a hand-rotatable knob 12 that is keyed to shaft 14. An aperture is formed in frame extension 16 to receive said shaft. A drive gear 18 is mounted to the distal end of shaft 14 and said gear 18 is in meshing engagement with control gear 20 that is keyed for conjoint rotation to longitudinally disposed drive shaft 22. A bore is formed in mounting block 24 to accommodate said drive shaft 22. Accordingly, manual rotation of knob 12 in a clockwise direction effects clockwise rotation of longitudinal shaft 22 and manual rotation of knob 12 in a counterclockwise direction effects rotation of drive shaft 22 in a counterclockwise direction.

Pinion gear 26 is also keyed to drive shaft 22 for conjoint rotation therewith; it is longitudinally spaced from gear 20 as depicted. Rack gear 28 is formed in a first or upward-facing side of transverse rod 30 and rack gear 32 is formed in a second or downward-facing side of transverse rod 34. Rack gears 28 and 32 respectively engage pinion gear 25 in diametrically opposing relation to one another when the novel assembly is in its assembled configuration. Accordingly, clockwise rotation of knob 12 effects clockwise rotation of pinion gear 26. Both rack gears 30 and 34 are thus displaced in converging relation to one another, i.e., in the respective directions of arrows 31 and 35, respectively. Counterclockwise rotation of said knob 12 effects counterclockwise rotation of pinion gear 26 and displacement of rods 30, 34 in diverging relation to one another, i.e., in the respective directions indicated by arrows 29 and 33.

This converging and diverging of rods 30 and 34 results in reducing and increasing the space between guide rails 40 and 42, respectively, because said guide rails are rigidly connected to upstanding rail supports 44 and 46. Pins 43 and 45 secure the respective lowermost ends of said rail supports 44, 46, to the outboard ends of rods 30 and 34.

More particularly, pins 45 and 47 respectively secure the uppermost ends of rail supports 44, 46 to guide rails 40, 42. Each rail support 44, 46 has a vertically-extending slot 49, 51 formed therein to allow height adjustability of said guide rails and a bushing 53, 55 is positioned between the uppermost end of each rail support and its associated guide rail as depicted.

Guide rails 40, 42 may be of any length. Accordingly, the same rack and pinion structure just described is provided along the longitudinal extent of a conveyor apparatus at predetermined longitudinal intervals. The parts in FIG. 1 that correspond to the just-described parts are denoted by the same reference numeral having the letter "a" appended thereto.

The remaining parts depicted in FIG. 1 are industry standard conveyor parts. For example, the reference numeral 60 denotes a conveyor belt made of individual parts as depicted but the construction has utility in connection with conveyor means of any type, including air-jet conveyor means having no belt. Vertical frames 62, 64 are also of conventional design, modified as needed to facilitate attachment thereto of the novel parts. Mounting blocks 66, 68 are mounted on the respective inboard sides of frames 62, 64 to provide support for rods 30 and 34 and are secured by pins collectively denoted 67.

It is worth noting that the novel apparatus can be used to change the position of only one guide rail in those situations, such as on timing screws, where two guide rails are not needed.

Figure 2:
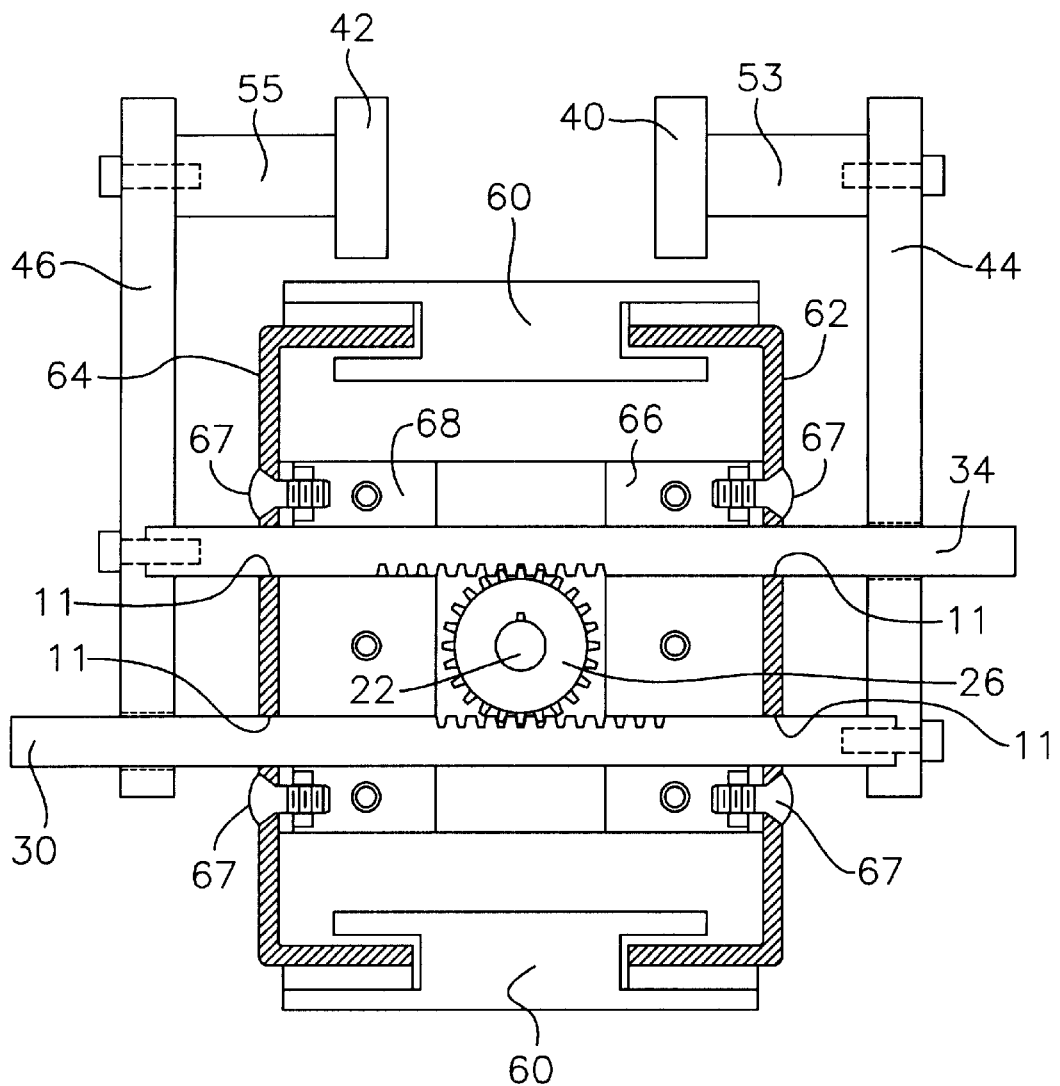
FIG. 2 is an assembled, front elevational view thereof.

FIG. 2 provides an assembled view of the rack and pinion assembly. The only reference numeral in FIG. 2 that does not appear in FIG. 1 is reference numeral 11 which collectively designates wiper seals at each location where rack gears 30 and 34 extend through frames 62 and 64.

Figure 3:
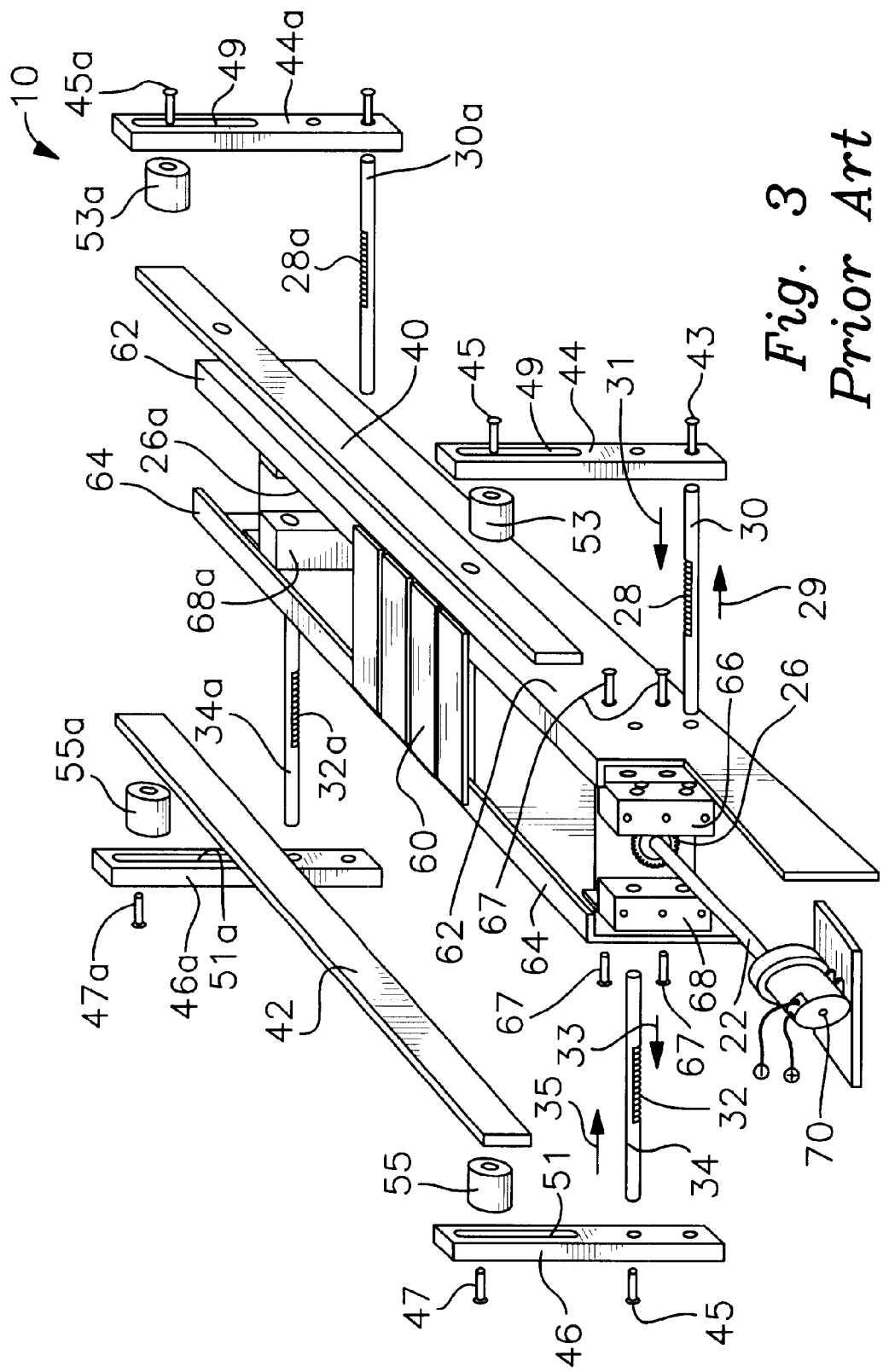
FIG. 3 is an exploded perspective view of a second embodiment of the prior art assembly.

In the alternative prior art embodiment of FIG. 3, the output shaft of reversible motor 70 is secured for conjoint rotation to drive shaft 22. Motor 70 is of the reversible type to enable clockwise and counterclockwise of said shaft 22. In this way, motor 70 replaces knob 12, shaft 22, and gear 20 of the first embodiment.

Figure 4:
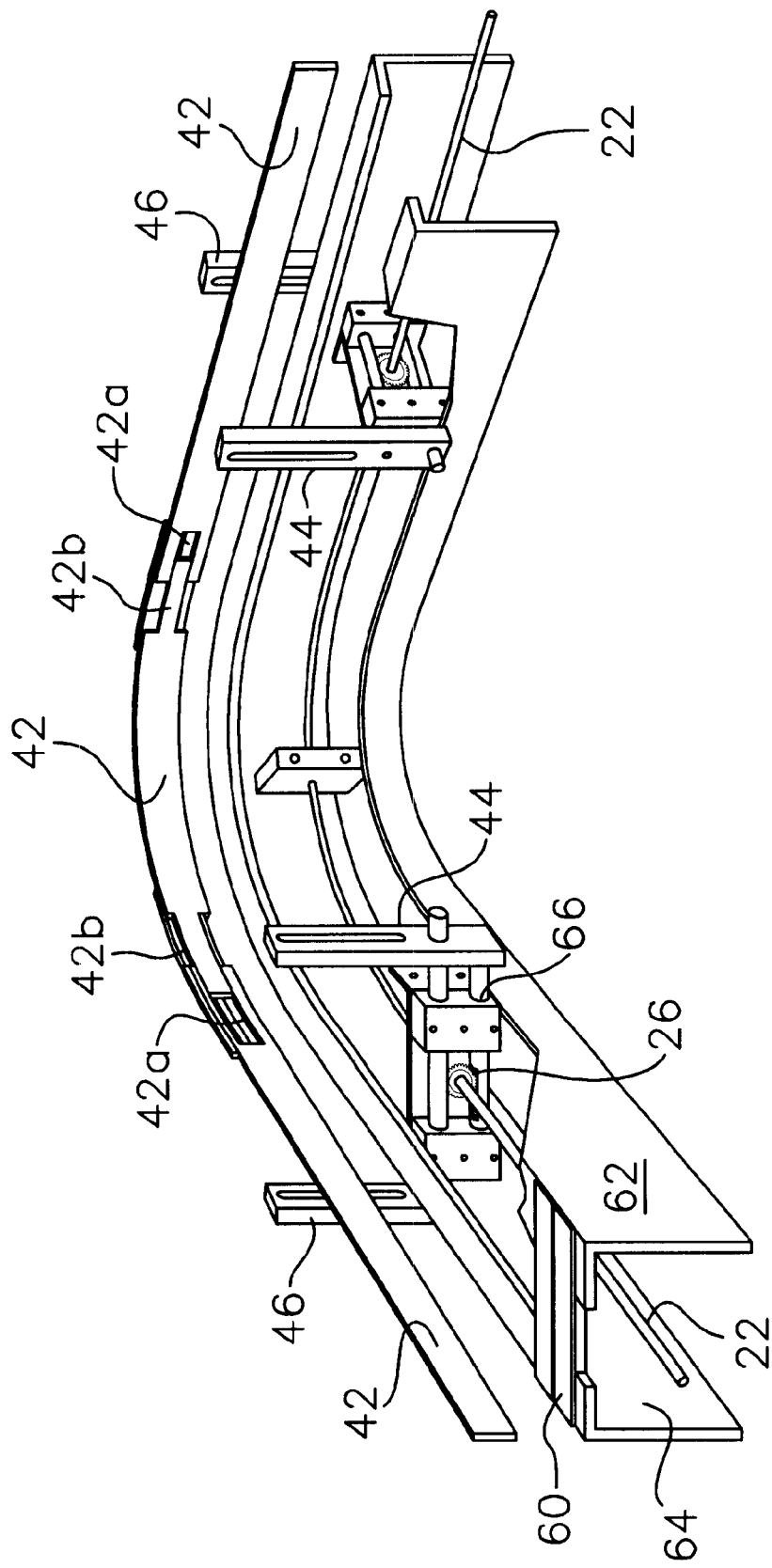
FIG. 4 is a perspective view of a prior art embodiment having a curvature formed therein.

FIG. 4 provides a perspective view of the prior art apparatus when a curve is formed in the conveyor apparatus. The structure is substantially the same as in the above-described embodiments where the conveyor is straight, with the exception that a section of guide rails 40, 42 (only one of which is depicted to simplify the drawing) and frames 62, 64 are curved. The rack and pinion-based structure for positioning the guide rails is not changed. Note that expansion slots 42a are formed in the respective ends of the guide rail sections adjacent to the curve and that the curved section of guide rail 42 has a tongue 42b protruding from each of its ends for sliding reception within said slots 42a. The respective lengths of the tongue and slots is sufficient to enable the tongues to remain within their respective slots as the distance between the guide rails 40, 42 is varied by the rack and pinion arrangement described above.

Figure 5A:
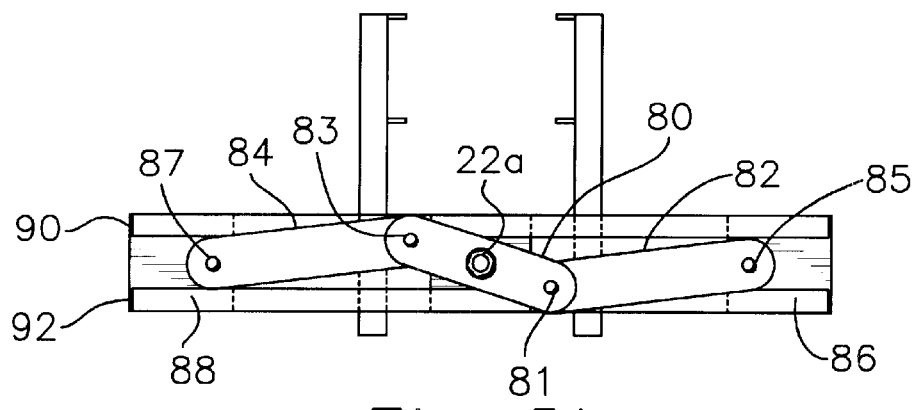
FIG. 5A is a front elevational view and the first figure of an animation depicting the sequential positions of a linkage that are displaced in diverging relation to one another to increase the lateral spacing between them.
Figure 5B:
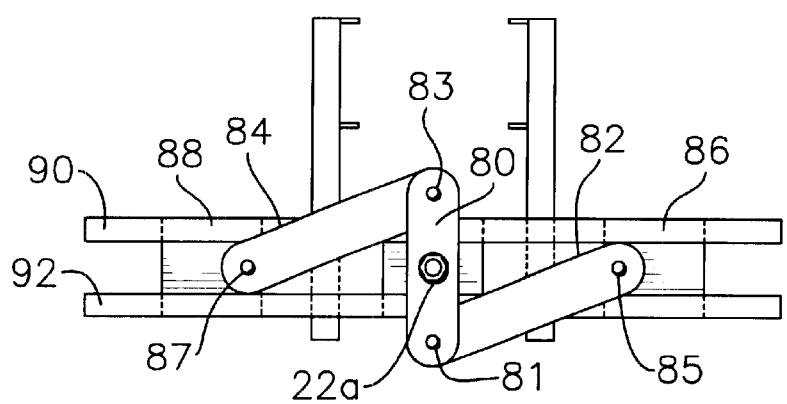
FIG. 5B is the second figure of said animation.
Figure 5C:
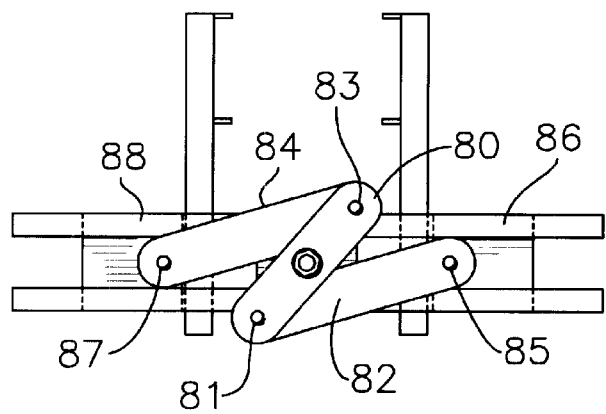
FIG. 5C is the third and last figure of said animation.

FIGS. 5A, 5B, and 5C are the first figures of this disclosure that relate directly to the present invention. Said figures depict a means for alternately moving guide rails 40, 42 toward and away from one another that does not include the above-described rack and pinion arrangement. Moreover, as will be understood in connection with FIGS. 6A–C, this novel embodiment does not require use of control knob 12 or motor 70.

More particularly, this embodiment employs drive shaft 22a and said shaft can be rotated clockwise and counter-clockwise as in the preceding embodiments by any suitable means such as manually rotatable control knob 12 and related assembly or reversible motor 70, although such manipulation means are not the preferred means as aforesaid. Instead of having a circular cross-section, drive shaft 22a has a non-circular cross section to thereby facilitate its connection to center link 80. Center link 80 is keyed to drive shaft 22a for conjoint rotation therewith and is pivotally connected at its opposite or outboard ends as at 81, 83 to first and second links 82, 84. Said first and second links are pivotally connected at their respective outermost or outboard ends as at 85, 87 to mounting blocks 86, 88, respectively. Mounting blocks 86, 88 are slideably mounted upon upper and lower rods 90, 92. It should therefore be understood that prior art rail supports 44, 46 and hence prior art guide rails 40, 42 are mounted to said mounting blocks 86, 88, respectively.

Accordingly, when center link 80 is positioned as depicted in FIG. 5A, guide rails 40, 42 are spaced apart from one another by a distance that is almost their maximum distance; all three links would lie in a horizontal straight line at said maximum distance. Clockwise rotation of drive shaft 22a over a sixty degree or so angle brings center link 80 to its FIG. 5B position; this represents an intermediate spacing for guide rails 40, 42. Further rotation of about another thirty degrees in the clockwise direction brings the links to their FIG. 5C position; this position is the position where guide rails 40, 42 are at their closest spacing relative to one another.

Figure 5D:
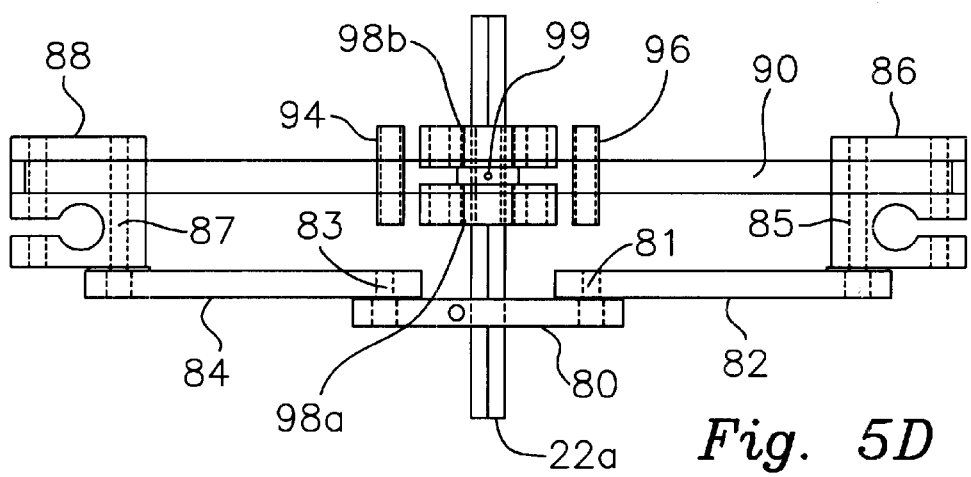
FIG. 5D is a top plan view of the novel structure.
Figure 5E:
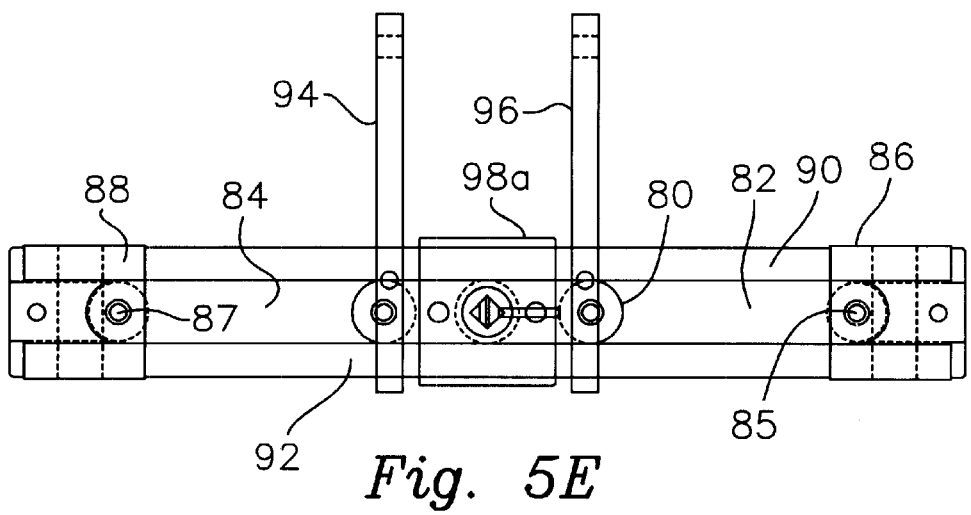
FIG. 5E is a front elevational view thereof.
Figure 5F:
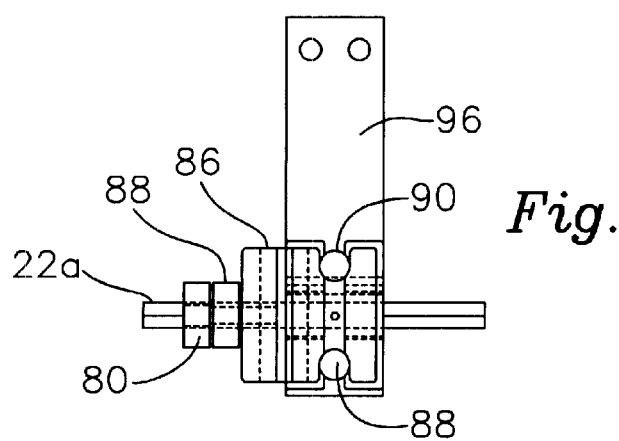
FIG. 5F is an end elevational view thereof.

FIGS. 5D, 5E, and 5F respectively provide a top, front, and an end view that further reveal the preferred structure of this embodiment. Links 80, 92 and 84 are collectively in a horizontal plane in these Figures, representing their respective positions when guide rails 40, 42, not depicted, are at their maximum spacing with respect to one another. Upstanding elements 94, 96 are a part of a conventional conveyor frame. Center blocks 98a, 98b are mounted on longitudinal shaft 22a and are spaced from one another by pivot yoke 99. Center blocks 98a, 98b, and pivot yoke 99 are supports and thus perform the same function as pillow blocks.

Figure 6A:
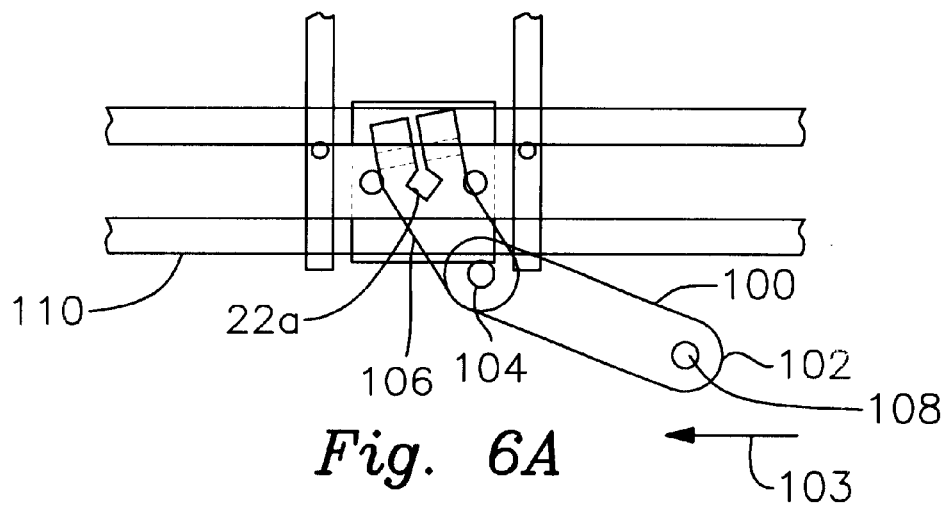
FIG. 6A is a front elevational view and the first figure of an animation depicting a novel control means for rotating the drive shaft.
Figure 6B:
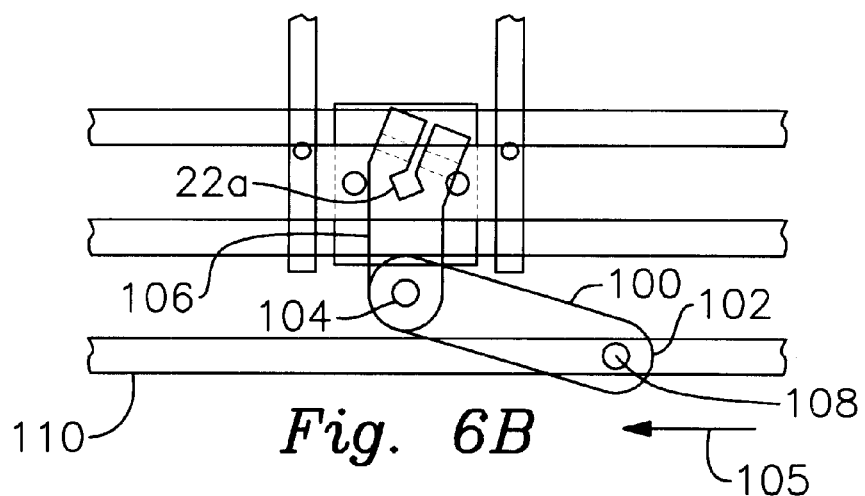
FIG. 6B is the second figure of said animation.
Figure 6C:
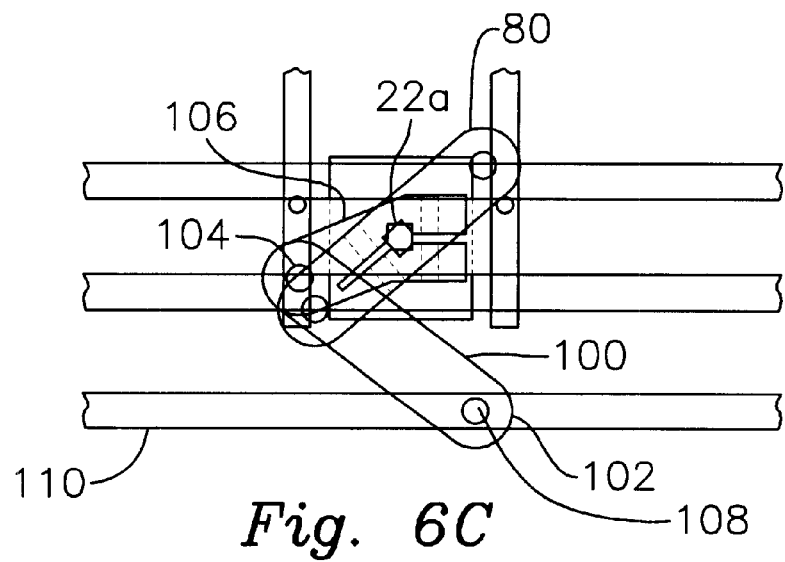
FIG. 6C is the third and last figure of said animation.
Figure 7A:
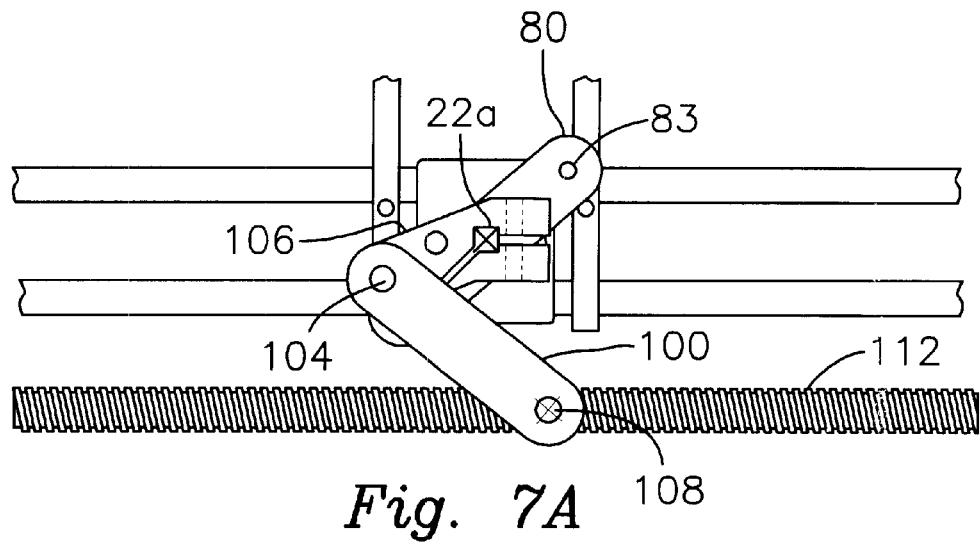
FIG. 7A is a front elevational view and the first figure of an animation depicting a novel control means for rotating the drive shaft.
Figure 7B:
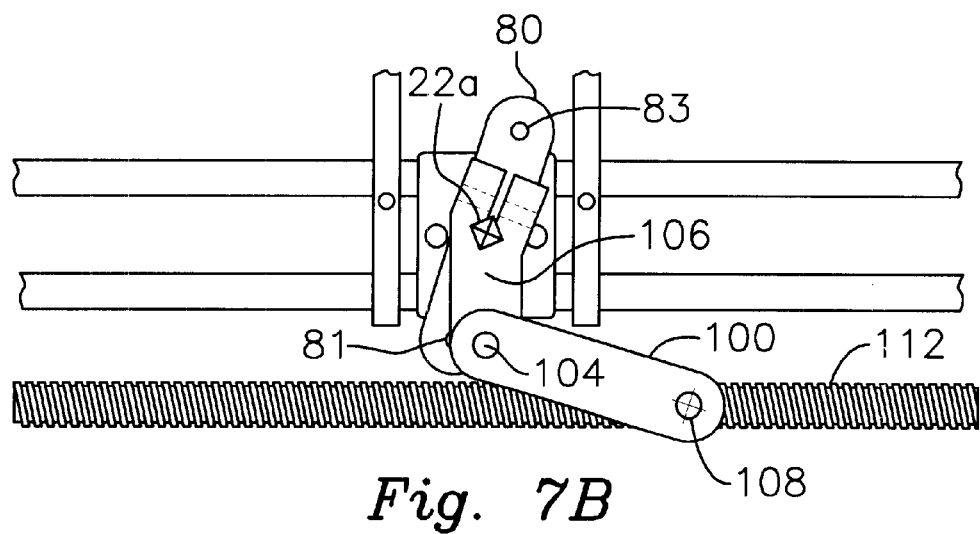
FIG. 7B is the second figure of said animation.
Figure 7C:
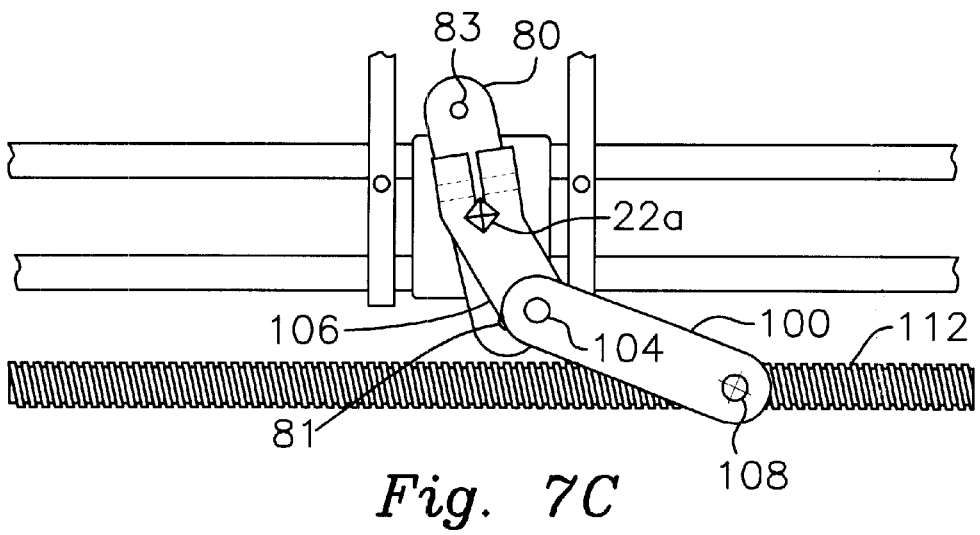
FIG. 7C is the third and last figure of said animation.

As mentioned earlier, rotation of drive shaft 22a may be under the control of a manual knob, a reversible motor, or other suitable prior art control means. FIGS. 6A, 6B, and 6C depict a novel manually operable means for accomplishing rotation of said drive shaft 22a. This embodiment includes an elongate crank arm 100 having a free end 102 that is grasped by a machine operator when it is desired to change the spacing between guide rails 40, 42. Crank arm 100 is pivotally connected as at 104 to bell crank 106 having a drive shaft engaging first end and a second end that is angularly disposed with respect to the first.

Beginning in the position of FIG. 6A, the machine operator pushes crank arm 100 in the direction indicated by single-headed directional arrow 103. Such motion causes drive shaft 22a to rotate about its axis of rotation in a clockwise direction until the position of FIG. 6B is reached. If it is desired to reduce the distance between the guide rails even more, crank arm 100 is again pushed, in the direction of arrow 105, until it attains the position of FIG. 6C, which final position represents the closest possible spacing of the guide rails. Note that center link 80 in FIG. 6C is in substantially the same position as center link 80 in FIG. 5C. Crank arm 100 is simply moved in the opposite direction to increase the spacing between the guide rails.

Free end 102 of control arm 100 may be pivotally and slideably connected as at 108 to a straight, elongate rail 110.

There are an infinite number of positions of functional adjustment between the closest and the furthest spacing of the guide rails. An operator can push or pull on crank arm 100 and thereby reposition the guide rails as needed much faster than when using a control knob or a motor that rotates drive shaft 22a. Moreover, the operator can see the instantaneous response of the guide rails so fine adjustments are easy to make.

One drawback of the adjustment means of FIGS. 6A–C is that it is not easily lockable. Thus, to maintain a selected rail spacing, an operator must continue to hold crank arm 100 or must rig up something to hold control arm 100 in place when it is not manually held.

This problem is solved by the embodiments of FIGS. 7A, 7B, 7C and FIGS. 8A and 8B. An elongate screw actuator 112 is employed in the embodiment of FIGS. 7A–C, said screw actuator being pivotally secured to the free end of control arm 100 at pivot point 108. The guide rails are at their narrowest spacing when control arm 100 is in its FIG. 7A position and at an intermediate spacing when said control arm is in its FIG. 7C position. The FIG. 7B position provides a spacing less than said intermediate spacing. There are an infinite number of spacings between the narrowest and broadest spacings. Including a worm gear, screw actuator 112 is substantially self-lockable.

Figure 8A:
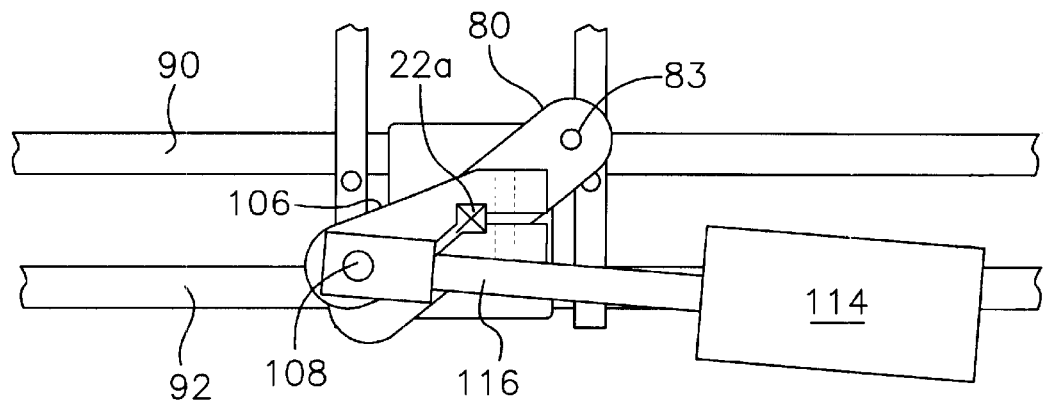
FIG. 8A is a front elevational view and the first figure of an animation depicting a novel control means for rotating the drive shaft.
Figure 8B:
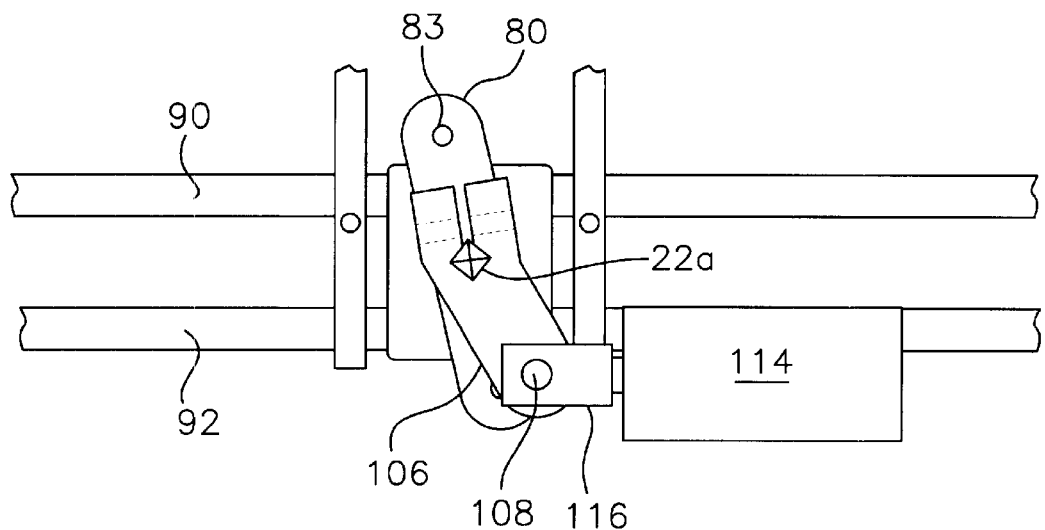
FIG. 8B is the second and last figure of said animation.

The embodiment of FIGS. 8A and 8B includes a pneumatic cylinder 114 having an actuator 116 pivotally connected as at 108 to the distal free end of control arm 100. The guide rails are at their narrowest spacing when actuator 116 is filly extended as depicted in FIG. 8A and at their broadest spacing when said actuator is filly retracted as depicted in FIG. 8B. Control arm is clearly lockable into either of said maximum and minimum positions but there are no intermediate positions.

Figure 9:
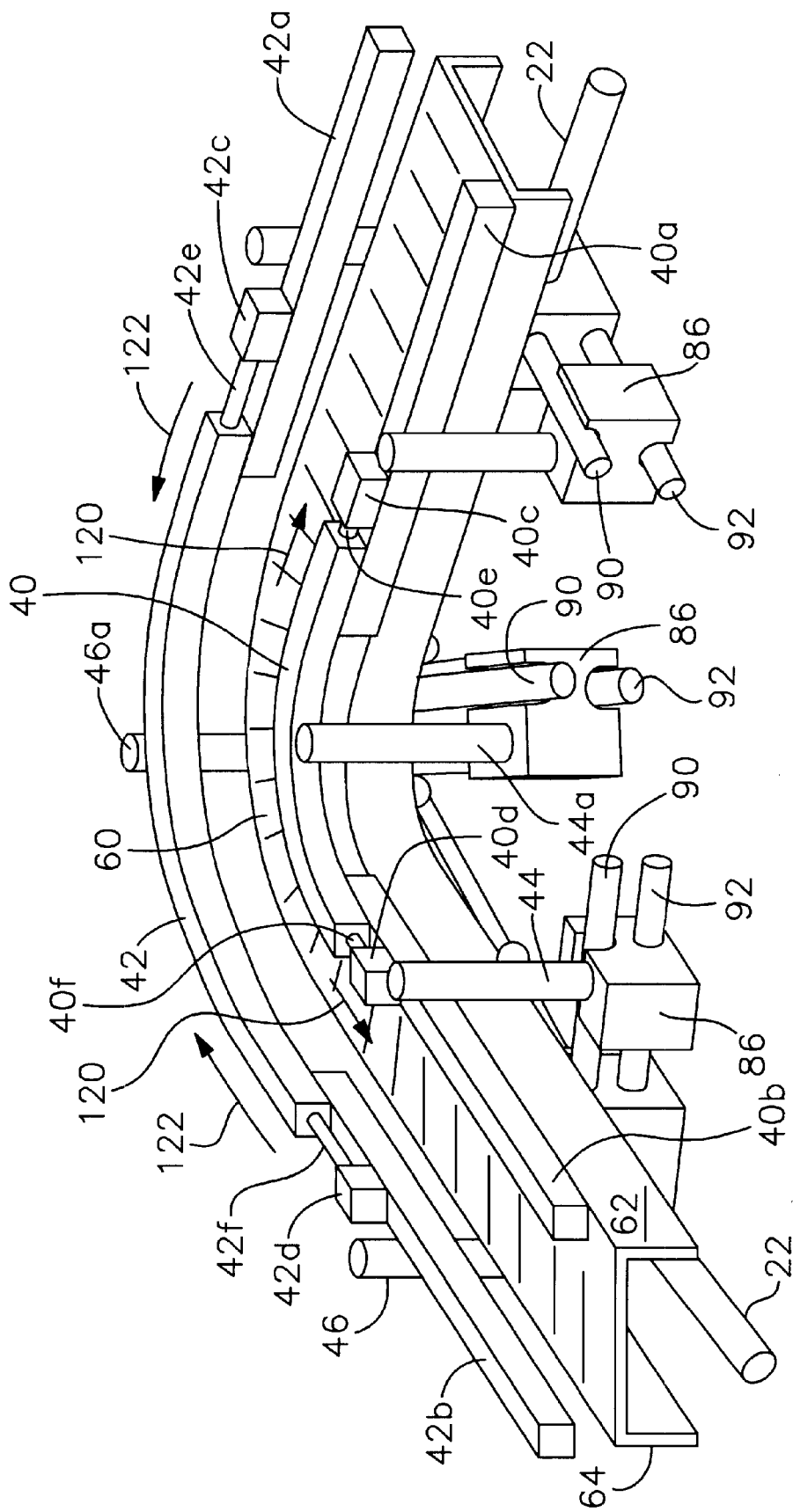
FIG. 9 is a perspective view depicting a curved section of the novel conveyance means.

FIG. 9 provides a perspective view of a curved section of the novel conveyance means. It should be understood that changing the spacing between guide rails 40, 42 necessitates changing the length of the curved sections, i.e., the curved sections have their greatest extent when said guide rails are at a maximum spacing and their least extent when said guide rails are at a minimum spacing. The novel means for accomplishing this change in length includes straight guide rail extensions 40a, 40b and 42a, 42b that are respectively slideably secured to opposite ends of curved guide rail sections 40 and 42. A stop block 40c, 40d is respectively fixedly secured to each extension 40a, 40b and a stop block 42c, 42d is respectively fixedly secured to each extension 42a, 42b as depicted. Curved guide rails 40, 42 are axially bored to respectively slideably receive rods 40e, 40f and 42e, 42f that are respectively secured to said stop blocks 40c, 40d and 42c, 42d. In this way, the effective length of curved guide rail 40 is lengthened by displacing extensions 40a, 40b in the direction of arrows 120 and said effective length is shortened by displacing said extensions in the opposite direction. Similarly, the effective length of curved guide rail 42 is shortened by displacing extensions 42a, 42b in the direction of arrows 122 and said effective length is lengthened by displacing said extensions in the opposite direction.

The novel linkage is free of gears and motors. It does not require frequent maintenance or adjustment and thus reduces conveyor system downtime. The spacing between the guide rails can be changed quickly and easily, in both straight and curved sections thereof. It has utility with all types of conveyance systems, whether of the belt, gravity, or air type. It also has utility in connection with machines or tools other than conveyance systems.

It will be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described.

What is claimed is:

1. An apparatus for varying the lateral spacing between guide rail in a conveyor assembly, comprising:

a drive shaft of elongate construction, said drive shaft being mounted for rotation about a longitudinal axis of rotation;

rotation means for selectively rotating said drive shaft in a first direction about said longitudinal axis of rotation and in a second direction about said axis, said second direction being opposite to said first direction;

said rotation means including a linkage means;

said linkage means including a center link and two outboard links;

said center link being centrally apertured to accommodate said drive shaft;

said center link being mounted for conjoint rotation with said drive shaft so that rotation of said drive shaft effects simultaneous and corresponding rotation of said center link;

said center link being pivotally connected at its opposite, outboard ends to inboard ends of said respective outboard links;

each outboard link of said two outboard links having an outermost free end;

a slideably mounted mounting block pivotally connected to respective outermost free ends of said outboard links;

a rail support member mounted in upstanding relation to each of said slideably mounted mounting blocks;

a first guide rail mounted to a first rail support member and a second guide rail mounted to a second rail support member;

whereby rotation of said drive shaft in said first direction effects convergence of said first and second guide rails; and whereby rotation of said drive shaft in said second direction effects divergence of said first and second guide rails.

2. The apparatus of claim 1, further comprising:

a control gear mounted on said drive shaft for conjoint rotation therewith;

said control gear being longitudinally spaced apart from said center link;

a drive gear disposed in meshing engagement with said control gear;

an elongate control shaft having said drive gear mounted on a distal end thereof for conjoint rotation therewith;

a control knob mounted on a proximal end of said elongate control shaft for conjoint rotation therewith;

whereby manual rotation of said control knob in a first direction effects rotation of said control gear and hence said drive shaft in said first direction; and whereby manual rotation of said control knob in a second direction opposite to said first direction effects rotation of said control gear and hence said drive shaft in said second direction.

3. The apparatus of claim 1, further comprising:

a reversible motor means having an output shaft secured to said drive shaft for concurrent rotation therewith;

whereby rotation of said output shaft in said first direction effects convergence of said first and second guide rails; and whereby rotation of said output shaft in said second direction effects divergence of said first and second guide rails.

4. The apparatus of claim 1, further comprising:

a bell crank means having a first end mounted to said drive shaft for conjoint rotation therewith and said bell crank means having a second end that is angularly disposed with respect to said first end;

an elongate control arm having a first end pivotally secured to said second end of said bell crank means; and means for displacing said control arm so that such displacement effects pivotal displacement of said bell crank and hence rotation of said drive shaft.

5. The apparatus of claim 4, wherein said means for displacing said control arm is a manual means, said control arm having a second end adapted to be manually grasped;

whereby manual displacement of said elongate control arm in a first direction effects rotation of said drive shaft in said first direction; and whereby manual displacement of said elongate control arm in a second direction effects rotation of said drive shaft in said second direction.

6. The apparatus of claim 4, wherein said means for displacing said control arm is a screw actuator pivotally secured to said second end of said control arm;

whereby rotation of said screw actuator in a first direction effects rotation of said drive shaft in said first direction; and whereby rotation of said screw actuator in a second direction effects rotation of said drive shaft in said second direction.

7. The apparatus of claim 4, wherein said means for displacing said control arm is a pneumatic cylinder having an actuator pivotally secured to said second end of said bell crank means;

whereby displacement of said actuator in a first direction effects rotation of said drive shaft in said first direction; and whereby displacement of said actuator in a second direction effects rotation of said drive shaft in said second direction.

8. The apparatus of claim 1, further comprising:

a pair of curved guide rails formed by forming a bend of predetermined curvature in said straight guide rails, said pair of curved guide rails enabling said conveyor assembly to follow a curved path of travel;

an extension guide rail being slideably secured to opposite ends of each said curved guide rails;

each curved guide rail being axially bored at its opposite ends;

an elongate rod being slideably received within each of said axial bores;

a stop member being fixedly secured to a free end of each of said elongate rods;

each of said stop members being fixedly secured to a respective elongate rod;

whereby the effective length of said curved guide rails is changed by sliding said extension guide rails with respect to said curved guide rails.

* * * * *